June 1, 1943. H. G. SHAKESPEARE 2,320,546
DETACHABLE CLEVIS
Filed Nov. 18, 1941
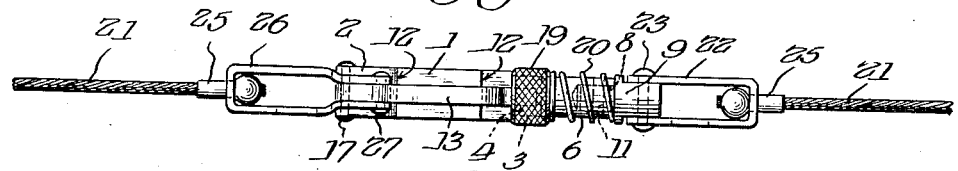
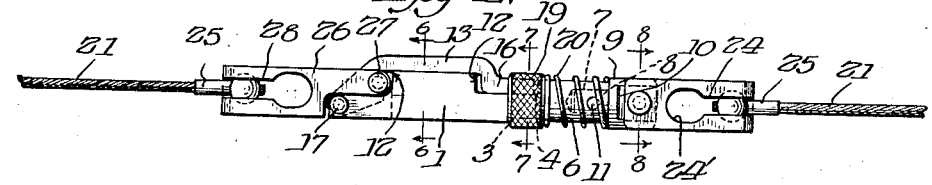
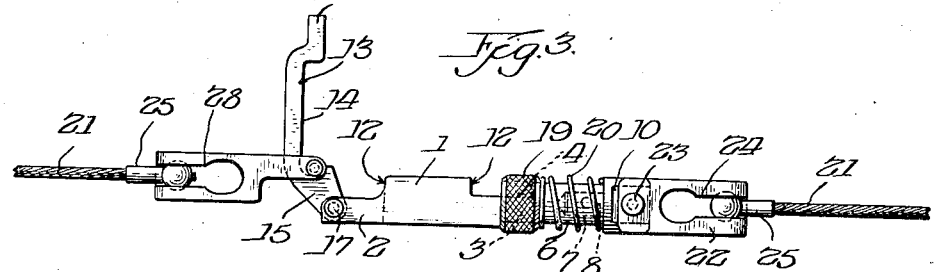
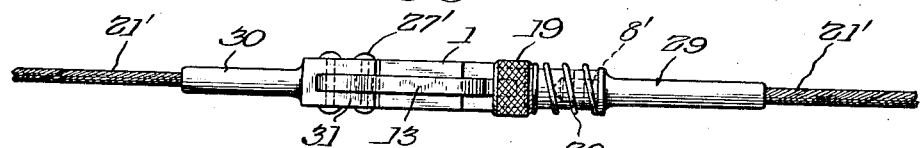
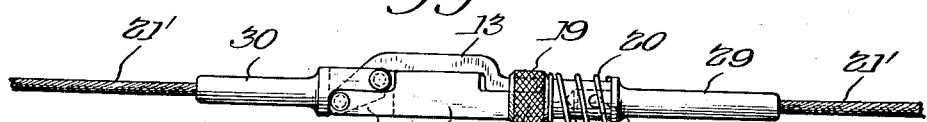
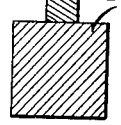
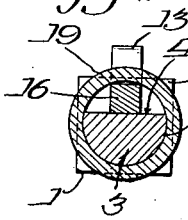
Inventor:
Henry G. Shakespeare
By W. F. Kellogg
Atty.

Patented June 1, 1943

2,320,546

UNITED STATES PATENT OFFICE 2,320,546

DETACHABLE CLEVIS

Henry G. Shakespeare, Kalamazoo, Mich., assignor to Shakespeare Products Company, Kalamazoo, Mich., a corporation of Michigan Application November 18, 1941, Serial No. 419,607

6 Claims. (Cl. 24—68)

This invention relates to improvements in connectors and particularly, to quick detachable clevises, having for an object to provide a detachable clevis especially adapted for use in connecting cables, chains and the like, operable in a manner to take up a predetermined amount of slack from a cable or chain engaged thereby and to thus maintain such connected cable or chain under the desired or required tension.

It is also an object of the invention to provide a clevis of the indicated character which may be quickly and readily engaged with cables or chains to be connected thereby and as quickly disengaged therefrom; moreover, to provide effectual means whereby the ends of cables or chains connected through the same will be positively retained in fixed relation and under constant and uniform tension.

Moreover, it is an object of the invention to provide a clevis capable of quick operation to a "disengaged" position, whereby to relieve previously applied cable or chain tension as well as to disconnect the same and, if desired, disengage the clevis from the previously engaged cable or chain.

In order that the invention and its mode of operation may be readily understood by those skilled in the art to which it appertains, I have in the accompanying drawing and the detailed description based thereupon, set out several embodiments of my invention.

In this drawing:

Figure 1 is a top view of my improved clevis showing the same in its closed or connecting position.

Figure 2 is a side elevation of the same.

Figure 3 is a side elevation of the improved clevis with its operating parts in an open position.

Figure 4 is a top view of the improved clevis provided with slightly modified forms of connecting links.

Figure 5 is a side elevation of the same.

Figure 6 is a transverse section taken on the line 6—6 of Figure 2, looking in the direction in which the arrows point.

Figure 7 is a similar section taken on the line 7—7 of Figure 2, looking in the direction in which the arrows point.

Figure 8 is a transverse section taken on the line 8—8 of Figure 2, looking in the direction in which the arrows point.

Figure 9 is a side view of the latch lever employed by the quick detachable clevis.

Having more particular reference to the drawing, in connection with which like characters of reference will designate corresponding parts throughout, the improved adjustable clevis comprises a body 1, substantially square in cross-section, having relatively spaced longitudinally disposed and parallel bearing fingers 2 integral with the lower portion of one end thereof. The opposite end of the body is formed or otherwise provided with a reduced longitudinal extension 3, having a portion of its normally upper side flattened, as at 4, and its sides rounded as at 5, while the outer end portion thereof is substantially cylindrical, as indicated by the numeral 6, and of a depth approximately corresponding to that of the body 1, as shown in Figures 2 and 3 of the accompanying drawing. A co-axially disposed pocket 7 is formed in the outer end of the cylindrical extension 6 and receives therein a shank or stud 8 carried on the adjacent side of a cross-sectionally circular head 9 having its opposite sides flattened at 10, for a purpose presently described. A coupling pin 11 is diametrically engaged through adjacent portions of the extension 6 and shank 8, thus fixedly connecting the same.

At this point, attention is invited to the fact that due to the formation and positioning of the fingers 2 and the extension 3 upon opposite ends of the body 1, the latter will present substantially right angular formed shoulders 12 upon its said ends.

A latch lever 13 is provided on the body 1 and, as will be seen, upon reference to Figure 9 of the drawing, is formed with an approximately inverted U-shaped intermediate portion 14 receivable, at times, over the normally upper side of the body 1 and its shouldered opposite end portions 12, an obliquely disposed thickened end 15, and a substantially right angularly arranged finger engaging piece or handle 16. The upper extremity of the thickened end 15 is pivotally mounted upon a pin 17 engaged in the ends of the fingers 2, hence, permitting movement of the lever to positions illustrated by Figures 2 and 3 of the drawing. Obviously, when said lever 13 is in closed position, (Figure 2) its inverted U-shaped intermediate portion 14 will have embracing-like engagement over the normally upper and shouldered portions 12 of the body 1, and the right angularly disposed piece or handle 16 will be flushly received upon the flattened side 4 of the extension 3. The obliquely disposed thickened end 15 has a shouldered and curved seat 18 formed in its inner side in substantially opposed relation to the right angularly arranged piece or handle 16.

In order that the latch lever 13 may be secured or releasably locked in closed position (Figure 2), I slidably engage a knurled circular locking sleeve 19 over the cylindrical portion 6 of the extension 3, the outer end of which has engagement with the adjacent convolution of an expansible coiled spring 20 received upon the outer end portion of said cylindrical portion 6 and having its opposite end bearing upon that shoulder provided adjacent the point of jointure of the head 9 therewith. Thus, it will be understood that the circular locking sleeve 19 will be normally retained in that position shown in Figures 1, 2 and 3 of the drawing; also, that it may be slid outwardly upon the cylindrical portion 6 of the extension 3 against tension of the coiled spring 20 so as to permit flush engagement of the right angularly formed handle 16 with the flattened side 4 of said extension 3. Obviously, with release of the slidable locking sleeve 19, the same will be moved under influence of the expensible coiled spring 20 back onto the extension 3, engaging over the adjacent portion of the handle 16, consequently, securing the latch lever 13 in closed position with respect to the body 1.

Cables 21, or the like, are adapted to be connected by my improved clevis and to accomplish such connection, a clevis link or coupling 22, consisting of a substantially U-shaped strap metal body has its free end or leg portions overlappingly engaged with the adjacent portion of the head 9 in contact with the flattened sides 10 thereof and then connected to the head by engaging a coupling pin 23 through adjacent portions of said clevis link 22 and the head 9. A longitudinal slot 24, having one end enlarged as at 24', is formed in one side and a part of the basal portion of the clevis link 22 and permits of introduction of a ball-headed coupling element 25 into engagement with the clevis link 22; such coupling element being connected to an adjacent end of one of the cables 21.

A second clevis link 26, consisting of a substantially U-shaped body made of strap metal or other suitable material, is provided the opposite end of the improved adjustable clevis. The free end portions of the link 26 are inwardly offset with respect to the remainders thereof and embracingly engaged with the opposite sides of the adjacent end portion of the latch lever 13. A transversely disposed coupling or pivot pin 27 is engaged through and across the inner ends of the clevis link 26 and, as shown in Figures 1, 2 and 3 of the accompanying drawing, is adapted to be received in the curved seat 18 of the latch lever 13. A slot 28 is formed in one side and a portion of the basal part of the U-shaped clevis link 26 and is so shaped as to permit of introduction of a ball-headed coupling element 25, secured to the adjacent end of the remaining cable 21, thereinto, as shown in Figures 1 and 2 of the drawing. Thus, it will be seen that the several cables 21 are connected to the opposite ends of the adjustable clevis.

In usage of my improved adjustable clevis, and assuming that the cables 21 are connected as above described, it will be understood that when the latch lever 13 is in its open position (Figure 3), said cables will be slack and that the transverse coupling pin 27 of the clevis link 26 will be engaged or received in the curved seat 18 of the latch lever 13, as is also shown in Figure 3. With inward and downward pivotal movement of the latch lever 13 to that position upon the body 1, shown in Figures 1 and 2, the cables 21 will, obviously, be drawn toward each other and placed under a definite and predetermined tension. The latch lever 13 is releasably locked or secured in its said closed position by engagement of the knurled locking sleeve 19 over the adjacent part of the handle 16. In consequence, the clevis connection thus effected will remain secure and positive until such time as the locking sleeve 19 is slid out of engagement with the handle 16 of the latch lever 13 and the latter is permitted or caused to be upwardly or outwardly swung to its initial or open position (see Figure 3).

It will, of course, be understood that different types of clevis links may be employed for connecting cable, chains, or the like, to the opposite ends of my adjustable clevis. To this end, I have, in Figures 4 and 5, shown the improved adjustable clevis, provided with different types of clevis links, to wit, those elements designated by the numerals 29 and 30. The clevis link 29 carries a shank 8' upon its inner end receivable in the co-axial opening 7 in the adjacent end of the extension 6, and its outer portion is of elongated tubular formation adapted to clinchingly receive the adjacent end of the cable 21' therein. The clevis link 30 has a bifurcating inner end portion 31 embracingly engaged with the adjacent thickened end portion of the latch lever 13 and carries a transversely disposed coupling pin 27' adapted to be received in the curved and shouldered seat 18 of the latch lever 13. The outer portion of said coupling link is of elongated tubular formation and is adapted to clinchingly receive the adjacent end of a second cable 21' or the like, therein.

I claim:

1. A device of the character described, comprising a body having a reduced upper portion, a latch lever pivoted to one end of the body beyond its reduced upper portion having a seat on its normally inner side spaced to its pivotal mounting on the body, said lever being shaped to embracingly engage over the reduced portion of the body when in closed position, and means for locking the lever in closed position.

2. A device of the character described, comprising a body having one side thereof reduced, a latch lever pivoted to one end of the body having a seat on its normally inner side in spaced relation to its pivotal mounting on the body, said lever being shaped to snugly and embracingly engage with the reduced portion of the body when in its closed position, a coupling link engageable with the latch lever and in its said seat, and means for locking the latch lever in closed position.

3. A device of the character described, comprising a body having one side thereof reduced and angularly shouldered, a latch lever pivoted to one end of the body having a normally inwardly facing seat formed therein in spaced relation to its pivotal mounting on the body, said lever being shaped to correspond to the shape of the reduced portion of the body and adapted to embracingly engage over the same when in closed position, and means for locking the lever in closed position.

4. A device of the character described, comprising a body, spaced longitudinal bearing fingers on one end thereof, a longitudinal extension on its opposite end, a part of said extension having one side flattened, a latch lever pivoted between the bearing fingers having a seat formed in its inner side inwardly of its pivoting and its free end portion receivable, at times, upon the flattened side of said extension, and means on the extension lockingly engageable with the free end portion of the latch lever when received upon said flattened side.

5. A device of the character described, comprising a body having one side thereof reduced, spaced longitudinal bearing fingers on one end of the body, a longitudinal extension on its opposite end, that side of said extension adjacent the body reduced portion being flattened, a latch lever pivoted between the bearing fingers having an inwardly opening seat therein spaced inwardly from its pivoting and its free end portion receivable, at times, upon the flattened side of said extension, locking means on said extension engageable with the free end portion of said latch lever, and a coupling link engageable with said latch lever and in said inwardly opening seat.

6. A device of the character described, comprising a body having one side thereof reduced and its opposite ends right angularly shouldered, spaced longitudinal bearing fingers on one end of the body, a longitudinal shank on the opposite end of the body having a portion thereof in proximity to the adjacent end of the reduced side of said body flattened, a latch lever pivoted between the bearing fingers shaped for snug embracing engagement with and over the body reduced side and its free end receivable upon the flattened portion of said shank, the inner side of said latch lever having a seat formed therein spaced inwardly from its pivoting between said fingers, and means on said shank engageable with the free end of the latch lever for securing the same in closed position.

HENRY G. SHAKESPEARE.